(12) United States Patent
Burtner et al.

(10) Patent No.: US 8,001,204 B2
(45) Date of Patent: *Aug. 16, 2011

(54) UNIFIED COMMUNICATION ESCALATION

(75) Inventors: Edwin R. Burtner, Everett, WA (US); Thomas V. Gruver, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/903,178

(22) Filed: Oct. 12, 2010

(65) Prior Publication Data
US 2011/0029629 A1    Feb. 3, 2011

Related U.S. Application Data

(63) Continuation of application No. 11/468,935, filed on Aug. 31, 2006, now Pat. No. 7,814,160.

(51) Int. Cl.
    *G06F 15/16*    (2006.01)
(52) U.S. Cl. ......... 709/206; 709/207; 709/202; 709/217
(58) Field of Classification Search .................. 709/206, 709/207, 217, 202
See application file for complete search history.

(56) References Cited

U.S. PATENT DOCUMENTS

| | | | |
|---|---|---|---|
| 6,119,147 A * | 9/2000 | Toomey et al. | 709/204 |
| 6,301,609 B1 * | 10/2001 | Aravamudan et al. | 709/207 |
| 6,563,912 B1 * | 5/2003 | Dorfman et al. | 379/88.13 |
| 6,665,395 B1 | 12/2003 | Busey et al. | |
| 6,677,976 B2 | 1/2004 | Parker et al. | |
| 7,814,160 B2 | 10/2010 | Burtner et al. | |
| 2002/0049852 A1 | 4/2002 | Lee et al. | |
| 2004/0128139 A1 | 7/2004 | Ilan et al. | |
| 2005/0021638 A1 | 1/2005 | Caldini et al. | |
| 2005/0125498 A1 * | 6/2005 | Frank et al. | 709/206 |
| 2005/0288951 A1 | 12/2005 | Stone et al. | |
| 2006/0015556 A1 | 1/2006 | Pounds et al. | |
| 2008/0059587 A1 | 3/2008 | Burtner et al. | |

FOREIGN PATENT DOCUMENTS

| | | |
|---|---|---|
| EP | 1113631 | 7/2001 |
| WO | WO-2005057899 | 6/2005 |

OTHER PUBLICATIONS

"Cisco Unified Personal Communicator," Cisco Systems, Solution Overview, Copyright 2006 Cisco Systems, 5 pages.
Fout, Tom, "Integrating Windows Real-Time Communications into Applications," Microsoft Corporation, Jan. 15, 2002, 4 pages.
Lee, Kyu Ouk et al., "VoIP Interoperation with KT-NGN," 6th International Conference on Advanced Communication Technology, Publication 2004, vol. 1, pp. 126-128.
Raman, Bhaskaran et al., "Universal Inbox: Providing Extensible Personal Mobility and Service Mobility in an Integrated Communication Network," Third IEEE Workshop on Mobile Computing Systems and Applications, 2000, pp. 95-106.

* cited by examiner

*Primary Examiner* — Kyung-Hye Shin
(74) *Attorney, Agent, or Firm* — Perkins Coie LLP

(57) ABSTRACT

A method and system for providing message threads with messages of multiple modes of communication in a uniform manner is provided. A messaging system provides a unified communications user interface for message threads that include messages sent using different modes of communications. When a user wants to reply to a message of one mode with a message of another mode, the messaging system displays the communication client application context of the other mode so that the user can prepare and send the message using the appropriate functions. When the instant message is sent, the messaging system adds the instant message to the message thread so that it can be displayed as part of the message thread.

20 Claims, 14 Drawing Sheets

UNIFIED COMMUNICATION ESCALATION

CROSS REFERENCE TO RELATED APPLICATION

The present application is a Continuation application of U.S. patent application Ser. No. 11/468,935, filed Aug. 31, 2006, now U.S. Pat. No. 7,814,160 issued Oct. 12, 2010, and entitled "UNIFIED COMMUNICATION ESCALATION," which is incorporated herein in its entirety by reference.

BACKGROUND

Computer systems provide many different modes of communication through which users can send messages. These modes of communication include electronic mail, Voice over Internet Protocol ("VoIP"), instant messaging, voice mail, and so on. Typically, different communication client applications are used to support different modes of communication. A user who wants to communicate using instant messaging and electronic mail would need to have installed on their computer system an electronic mail client application and an instant messaging client application. Each communication client application, however, provides its own interface or context for its messages. An electronic mail client application may provide a context that includes from, to, subject, and input fields and icons for creating messages, sending messages, replying to messages, resolving addresses, and so on. An instant messaging client application may provide a context that includes a list of contacts that are online, a pop-up window that is displayed when a message arrives, and a chat window for displaying and inputting instant messages.

A sender who wants to send a message to a recipient may want to select a mode of communication that is most appropriate given the "presence" of the recipient. Users may make their presence information available so that other users can decide how best to communicate with them. The presence information may indicate whether a user is logged on ("online") with an instant messaging service or is logged off ("offline"). Presence information may also provide more detailed information about the availability of the user. For example, even though a user is online, that user may be away from their computer in a meeting. In such a case, the presence information may indicate "online" and "in a meeting." The presence information may indicate various levels of "presence." For example, "offline" is a low level of presence, "online—in a meeting" is a higher level of presence, and "online—at desk" is an even higher level of presence. A publishing user ("publisher") makes their presence information available to others by publishing their presence information to a presence server. The presence server then provides the presence information to subscribing users ("subscribers"). Thus, a presence server may use a subscriber/publisher model to provide the presence information. Whenever the presence information of a user changes, the presence server is notified of the change by that user's computer system and in turn notifies the subscribing users of the change.

A recipient may decide to reply to a message using a mode of communication different from the mode of communication of the original message. For example, a recipient viewing an electronic mail message may reply using instant messaging to provide the response immediately because the sender of the electronic mail message is currently online as indicated by the sender's presence information. In such a case, the recipient would move from the electronic mail client application to the instant messaging client application to send the reply. Similarly, a recipient upon receiving an instant message may reply using VoIP to fully explain the reply because the sender is currently not in a meeting as indicated by the sender's presence information.

A difficulty with sending replies to messages using different modes of communication is that switching communication client applications may cause a user to lose their train of thought. For example, after starting up or switching to an instant messaging client application, the user may not fully remember the substance of their intended reply. Another difficulty is that the content of the original message and the reply message are stored separately. In particular, when a recipient receives a reply that is in a mode different from the mode of the original message, the recipient will not be provided the content of the original message in the reply, unless the sender of the reply copied the content over to the reply. Another difficulty is that the original message and the reply are archived separately with no indication that they form a message thread.

SUMMARY

A method and system for providing message threads with messages of multiple modes of communication in a uniform manner is provided. A messaging system provides a unified communications user interface for message threads that include messages sent using different modes of communications. A message thread with messages of different modes of communication is referred to as a "multi-modal message thread." The messaging system displays the messages of a multi-modal message thread in a display area that shows the message/reply sequence of the message thread. When a user wants to reply to a message of one mode with a message of another mode, the messaging system displays the communication client application context of the other mode so that the user can prepare and send the message using the appropriate functions. When the instant message is sent, the messaging system adds the instant message to the message thread so that it can be displayed as part of the message thread.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
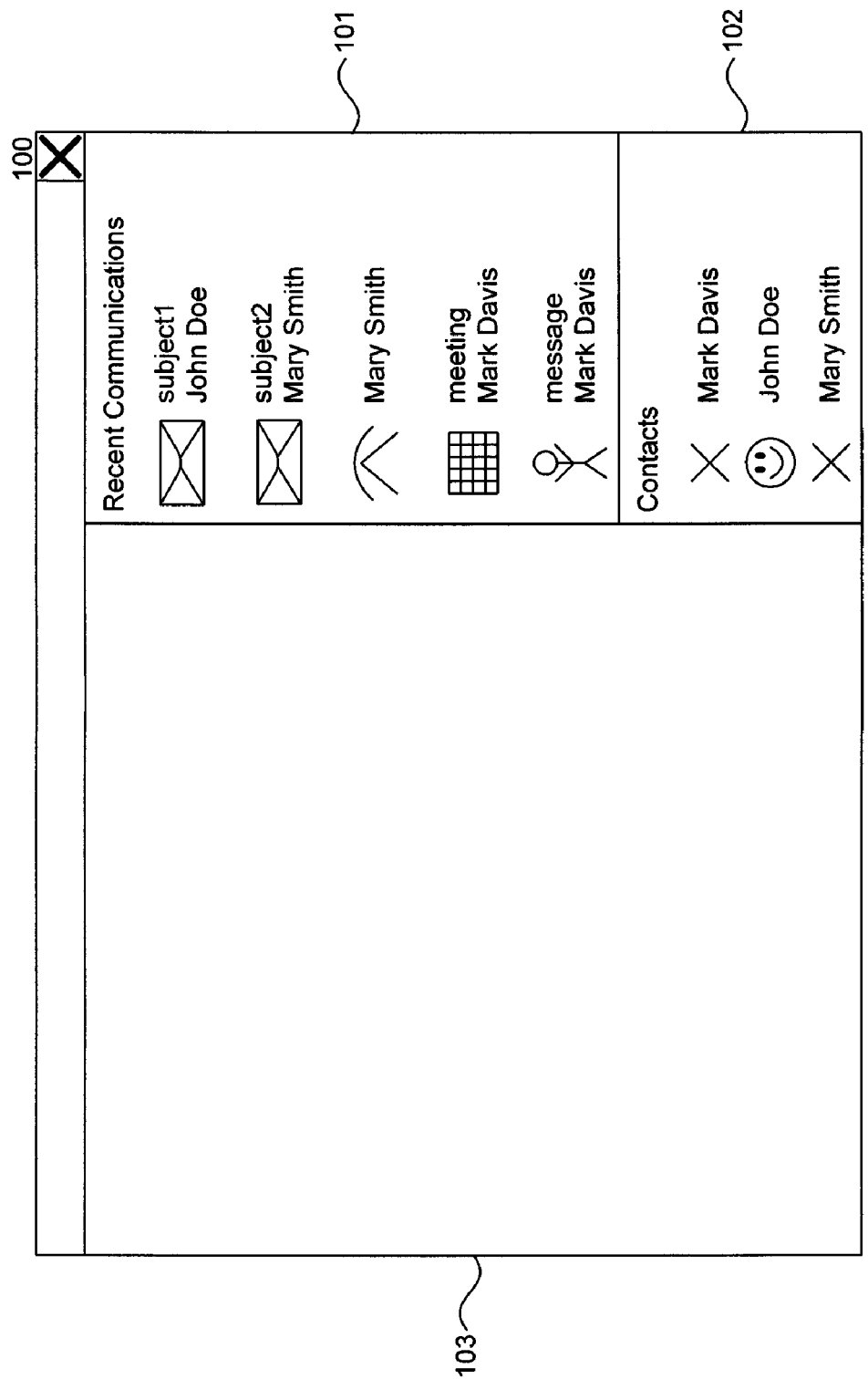
FIG. 1 illustrates a display page displaying recent communications and contacts of a user in one embodiment.

A method and system for providing message threads with messages of multiple modes of communication in a uniform manner is provided. In one embodiment, a messaging system provides a unified communications user interface for message threads that include messages sent using different modes of communications. A message thread with messages of different modes of communication is referred to as a "multi-modal message thread." The messaging system displays the messages of a multi-modal message thread in a display area that shows the message/reply sequence of the message thread. As an example, a multi-modal message thread may include a first electronic mail message, a first instant message that replies to the first electronic mail message, a second instant message that replies to the first instant message, and a second electronic mail message that replies to the second instant message. In such a case, the messaging system may display the first electronic mail message, followed by the first instant message, followed by the second instant message, followed by the second electronic mail message. Thus, the messaging system displays the entire context of the message thread even though the message thread includes messages of different modes. When a user wants to reply to a message of one mode with a message of another mode, the messaging system displays the communication client application context of the other mode so that the user can prepare and send the message using the appropriate functions. For example, if a user replies to an electronic mail message using an instant message, the messaging system may display the electronic mail message and an instant messaging window for input and sending of the reply instant message. When the instant message is sent, the messaging system adds the instant message to the message thread so that it can be displayed as part of the message thread. Because the messaging system displays multi-modal message threads and allows input of messages of different modes, a user can send messages of various modes while viewing the context of the entire message thread and within a communication client application context that is appropriate to the mode of communication.

In one embodiment, the messaging system may automatically select a mode of communication for replies to messages of the message threads. When a recipient wants to respond to a message of one mode, the messaging system may select a different mode for the reply based on the presence of the sender of the replied-to message. For example, if the message being replied to is an electronic mail message, the messaging system may automatically select an instant messaging mode for replying when the sender is currently online. The automatic selecting of a mode of communication that relies on a higher level of presence is referred to as "escalation" of the mode of communication. In some instances, the messaging system may automatically select a mode that relies on a lower level of presence, which is referred to as a "de-escalation" of the mode of communication. For example, if a user wants to reply to an instant message when the sender of the instant message is no longer online, the messaging system may select an electronic mail message mode of communication for the reply. In this way, users are relieved of the burden of having to select a mode of communication that is most appropriate for the recipient's current presence.

FIG. 1 illustrates a display page displaying recent communications and contacts of a user in one embodiment. Display page 100 includes a recent communications area 101, a contacts area 102, and a message display area 103. The recent communications area identifies recent communications that the user has received. In this example, the user has recently received electronic mail messages from John Doe and Mary Smith, a voice mail from Mary Smith, a meeting invitation from Mark Davis, and an instant message from Mark Davis. The communications have associated icons representing their modes of communication. The contacts area lists various contacts of the user along with an indication of the presence of the contacts. In this example, the user has contacts Mark Davis, John Doe, and Mary Smith. John Doe is currently online, and Mark Davis and Mary Smith are currently offline. When the user selects a message from the recent communications area, the messaging system displays that message in the message display area.

Figure 2:
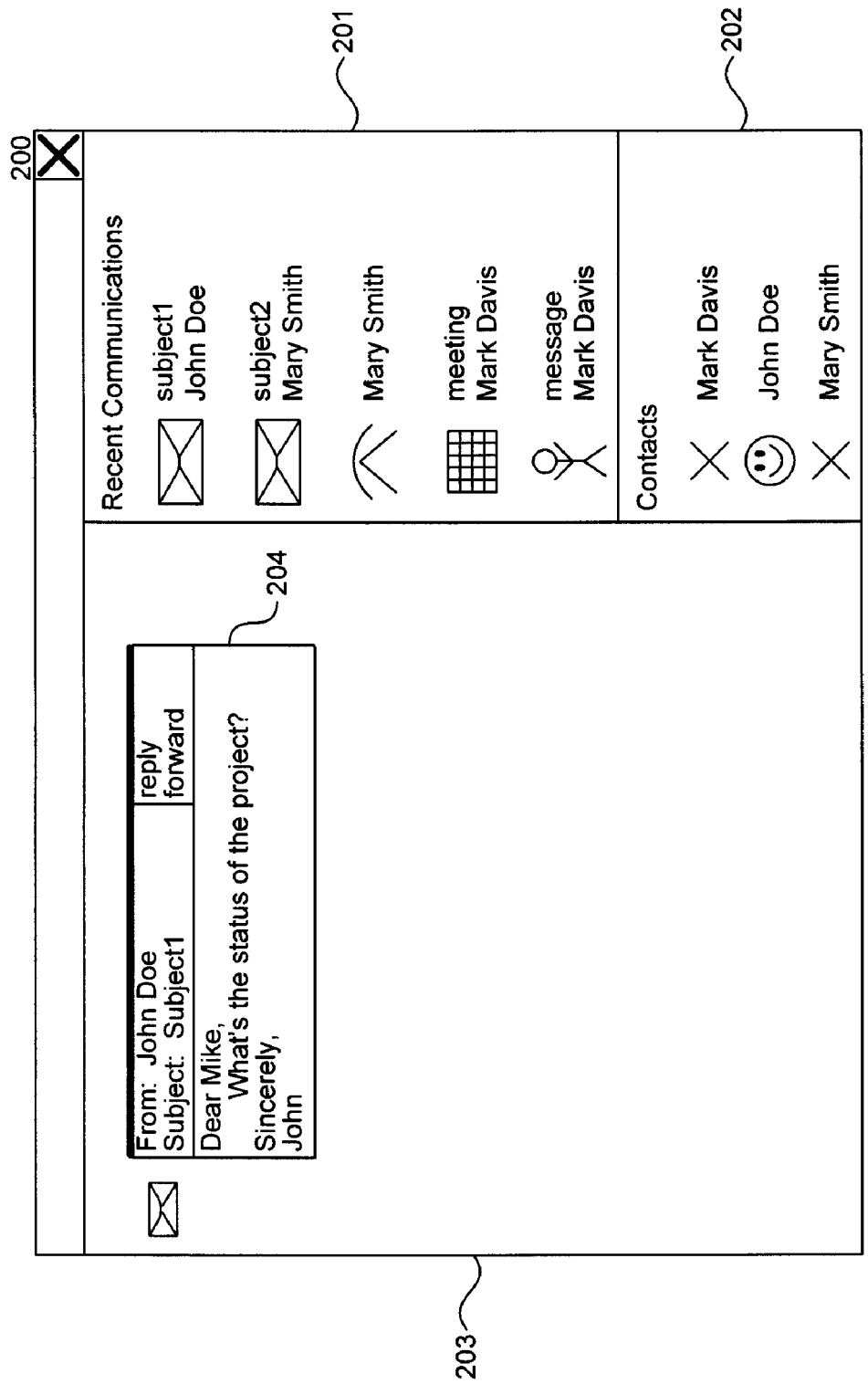
FIG. 2 illustrates a display page displaying an electronic mail message in one embodiment.

FIG. 2 illustrates a display page displaying an electronic mail message in one embodiment. Display page 200 includes a recent communications area 201, a contacts area 202, a message display area 203, and an electronic mail message 204. In this example, the user selected the electronic mail message from John Doe. In response, the messaging system retrieved the electronic mail message and displayed it in the message display area. The messaging system may invoke a component of the electronic mail client application to display the message in an electronic mail message context. In this example, the electronic mail context includes the familiar from and subject fields and the familiar reply and forward functions. When the user selects the reply function, the messaging system determines the appropriate mode of communication and invokes the component of the client application of that mode of communication.

Figure 3:
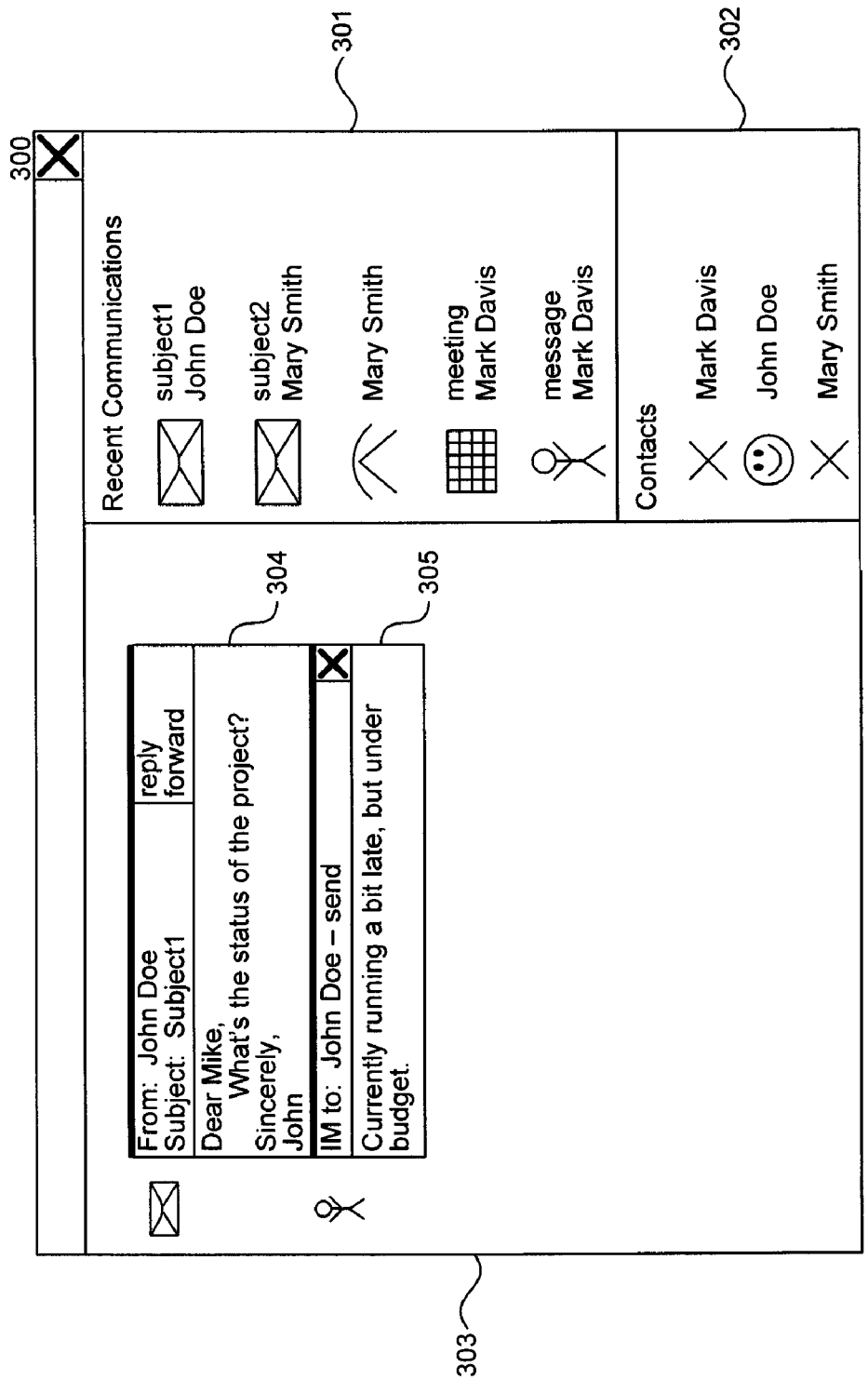
FIG. 3 illustrates a display page displaying a reply instant message in one embodiment.

FIG. 3 illustrates a display page displaying a reply instant message in one embodiment. Display page 300 includes a recent communications area 301, a contacts area 302, a message display area 303, an electronic mail message 304, and an instant message 305. The messaging system displayed an instant message reply area when the user selected the reply function of the electronic mail message. The messaging system determined that, since John Doe was currently online, an instant message was an appropriate mode of communication. The messaging system then invoked a component of the instant messaging client application to display a blank chat window within the reply area. The user then entered the reply into the chat window and selected the send function. At that point, the messaging system created a multi-modal message thread containing the electronic mail message and the instant message. Because the chat window is displayed just below the electronic mail message, the user can view the context of the electronic mail message to which the user is replying.

Figure 4:
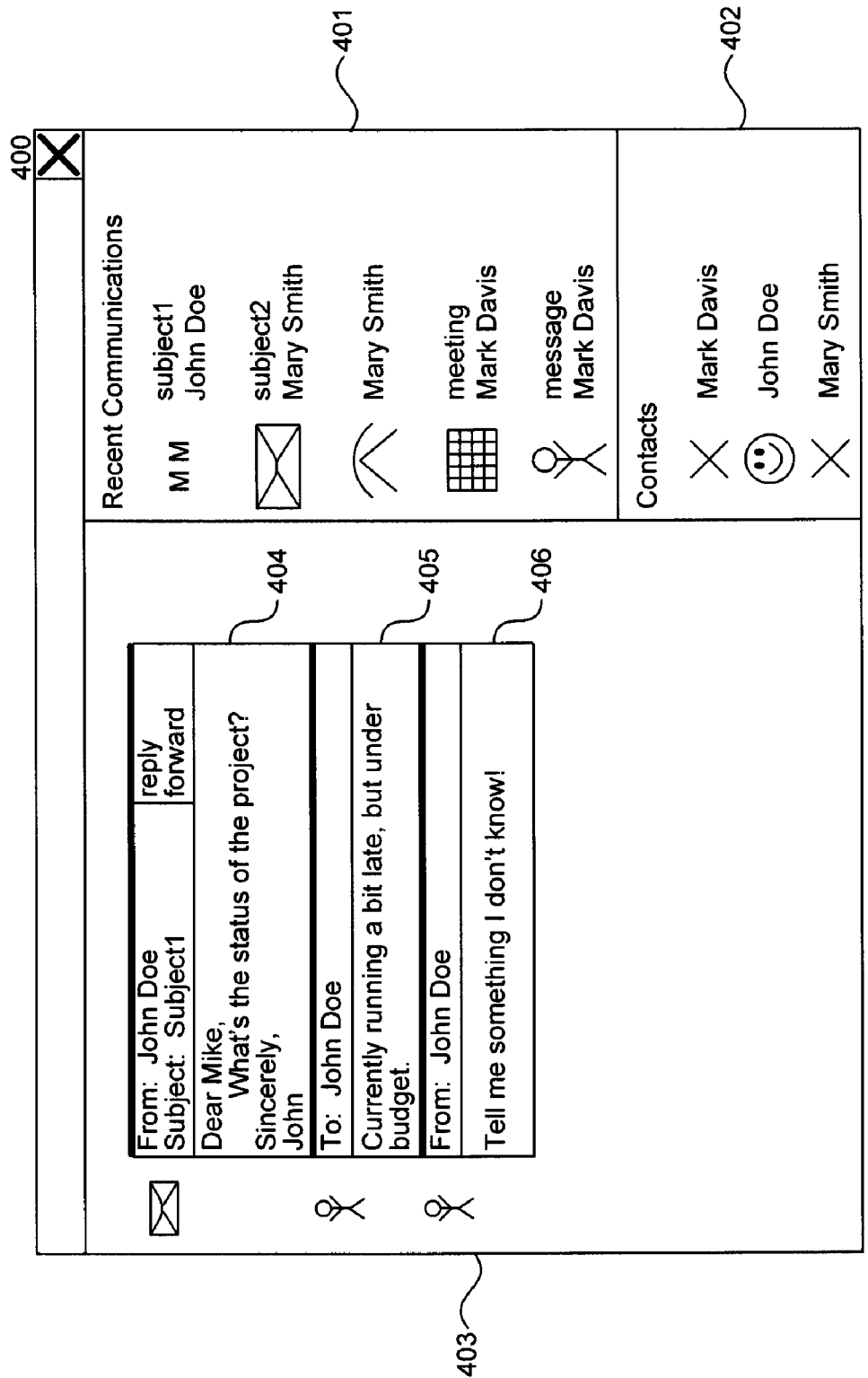
FIG. 4 illustrates a display page displaying a further reply instant message in one embodiment.

FIG. 4 illustrates a display page displaying a further reply instant message in one embodiment. Display page 400 includes a recent communications area 401, a contacts area 402, a message display area 403, an electronic mail message 404, a first instant message 405, and a second instant message 406. The second instant message 406 corresponds to a reply instant message sent by the recipient of the first instant message. The electronic mail message, the first instant message, and the second instant message form a multi-modal message thread. Since the message thread that was initiated with John Doe's electronic mail message is now multi-modal, the messaging system replaced the icon for that message in the recent communications area with an icon to indicate multi-modal ("MM").

Figure 5:
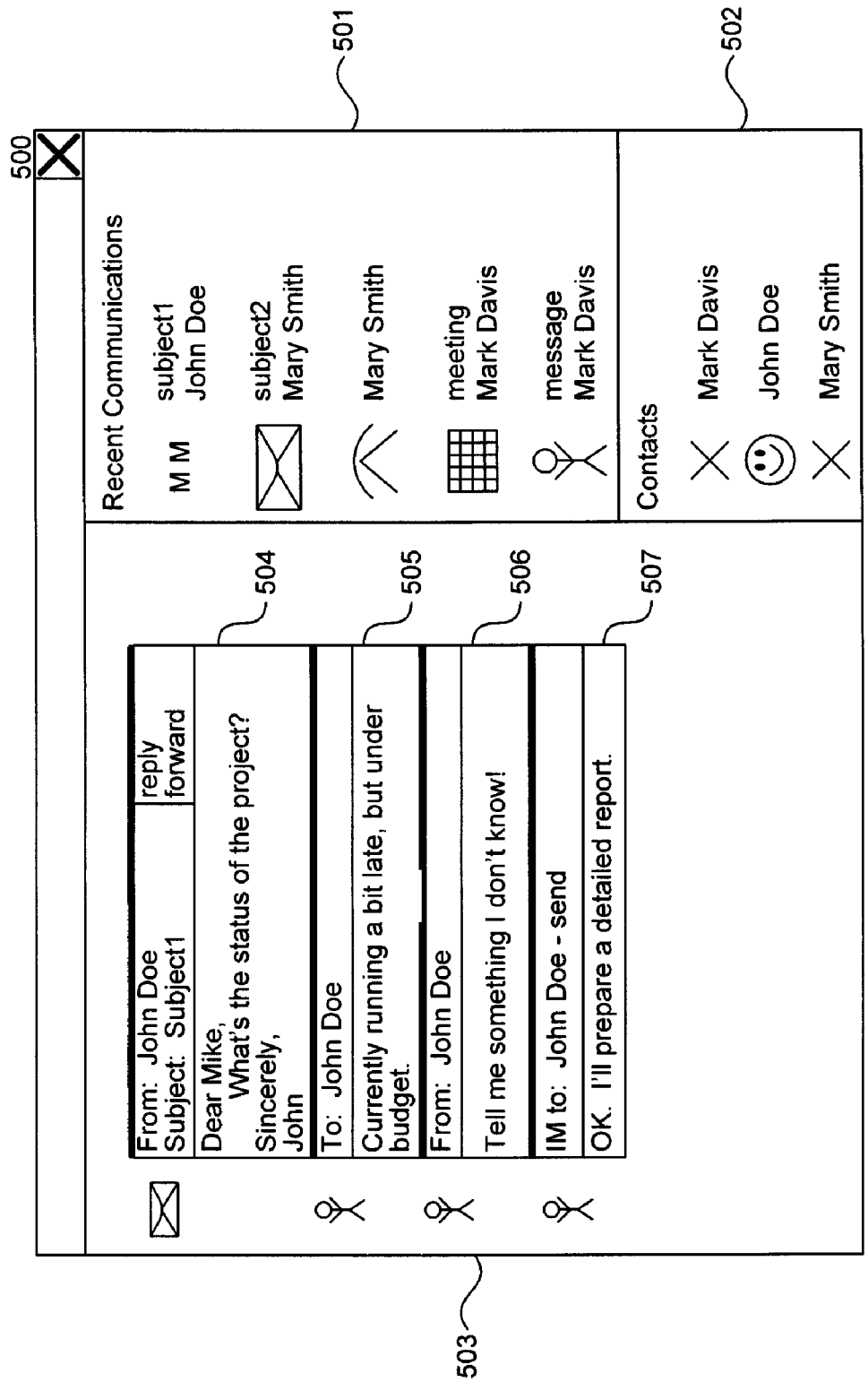
FIG. 5 illustrates a display page displaying a multi-modal message thread in one embodiment.

FIG. 5 illustrates a display page displaying a multi-modal message thread in one embodiment. Display page 500 includes a recent communications area 501, a contacts area 502, a message display area 503, an electronic mail message 504, a first instant message 505, a second instant message 506, and a third instant message 507. In this example, when the user selected to reply to the second instant message, the messaging system determined that, since John Doe was still online, the reply should be an instant message. In this example, however, John Doe went offline before the instant message was sent.

Figure 6:
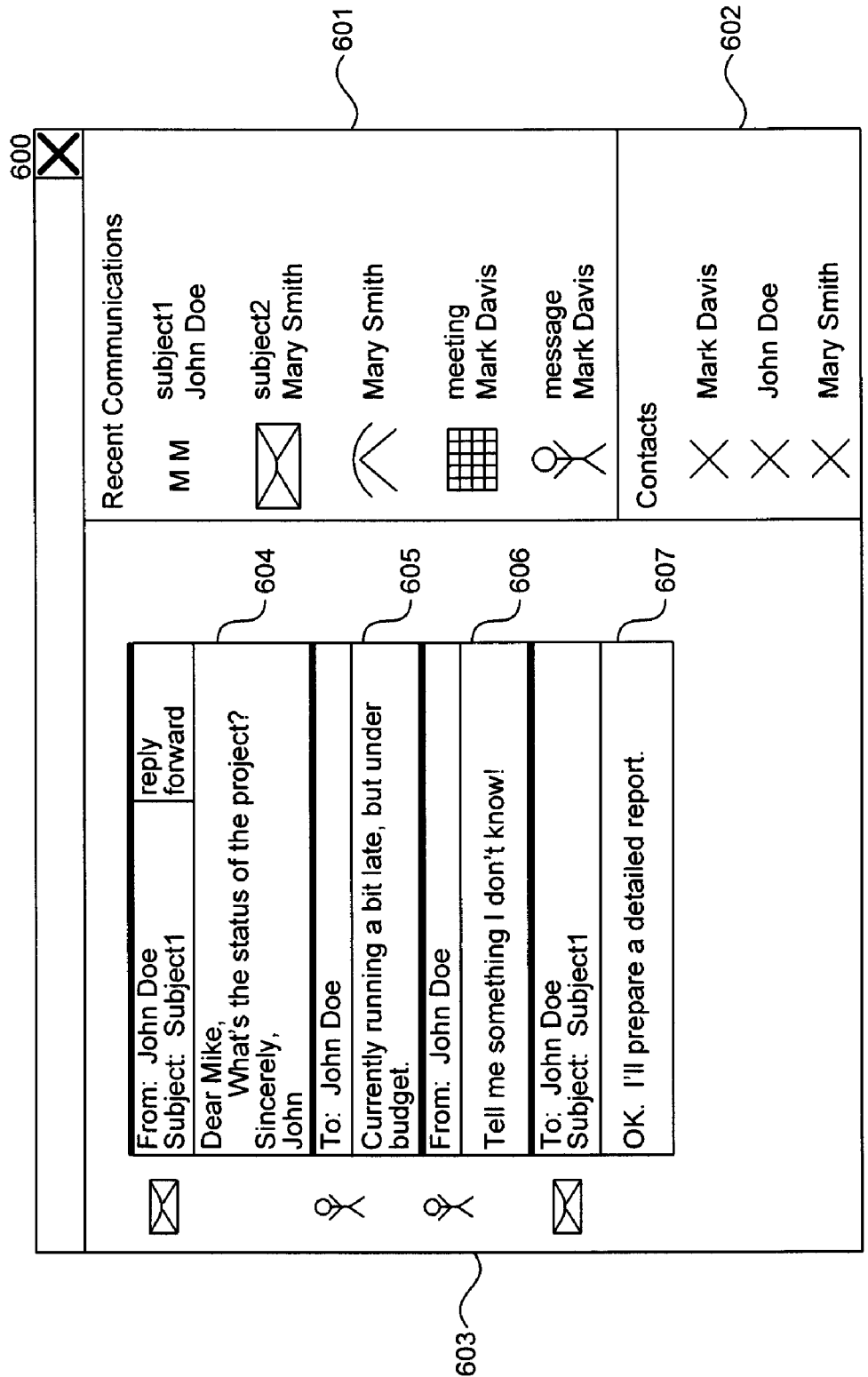
FIG. 6 illustrates a display page displaying a multi-modal message thread in which the mode of a reply changes in one embodiment.

FIG. 6 illustrates a display page displaying a multi-modal message thread in which the mode of a reply changes in one embodiment. Display page 600 includes a recent communications area 601, a contacts area 602, a message display area 603, a first electronic mail message 604, a first instant message 605, a second instant message 606, and a second electronic mail message 607. The contacts area indicates that the John Doe is currently offline. Since John Doe went offline before instant message 507 (FIG. 5) was sent, the messaging system changed the instant message to be an electronic mail message and displayed the content of the instant message as the second electronic mail message.

Figure 7:
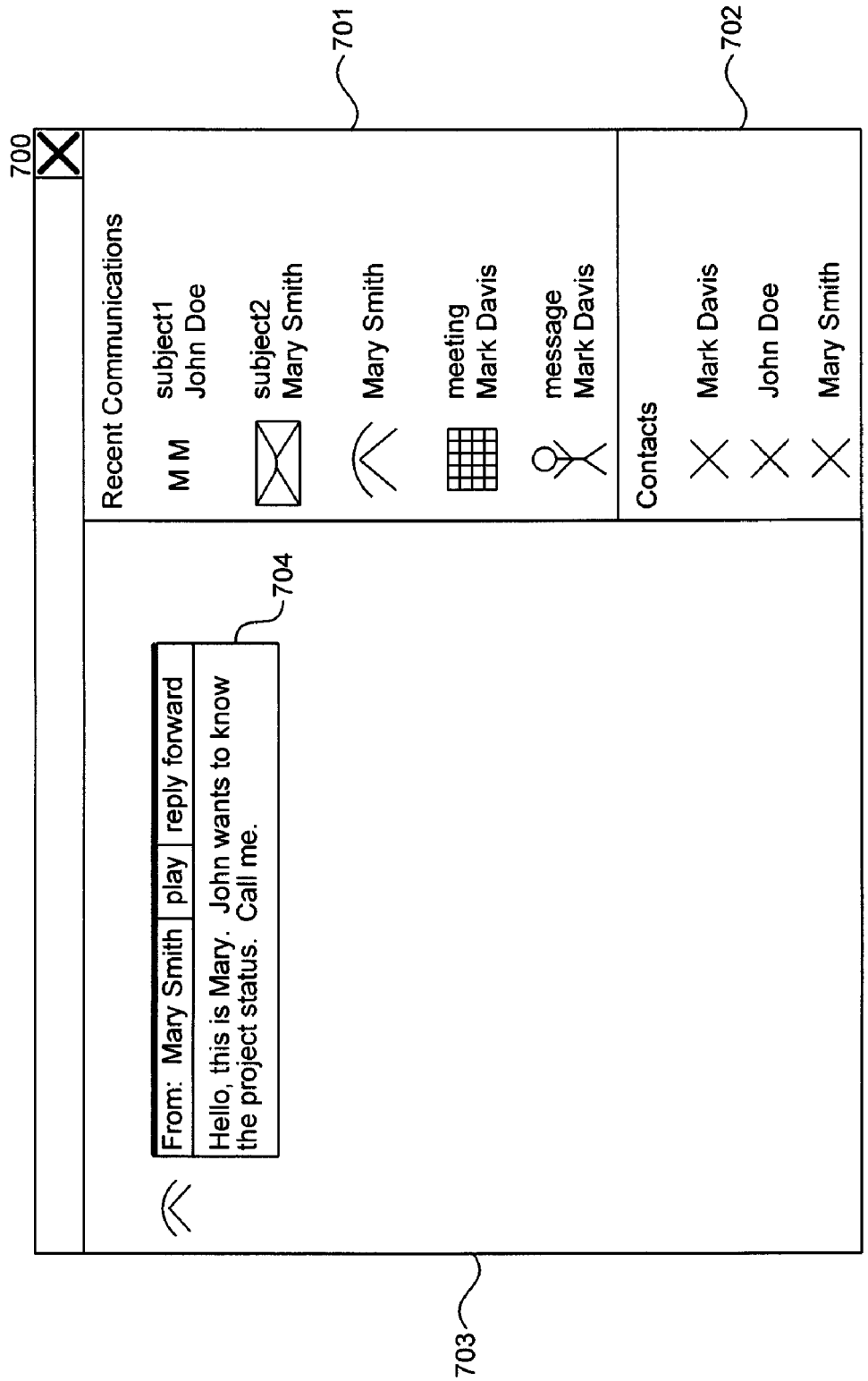
FIG. 7 illustrates a display page displaying a voice mail message in one embodiment.

FIG. 7 illustrates a display page displaying a voice mail message in one embodiment. Display page 700 includes a recent communications area 701, a contacts area 702, a message display area 703, and a voice mail message 704. The messaging system displayed the voice mail message in response to the user selecting Mary Smith's voice mail indicator displayed within the recent communications area. The messaging system invoked a component of a voice mail client application to display the voice mail message in the appropriate context. The voice mail client application may have converted the audio of the voice mail to text using speech recognition techniques. Alternatively, the voice mail message may be represented by an icon that a user can select to hear the content of the voice mail message.

Figure 8:
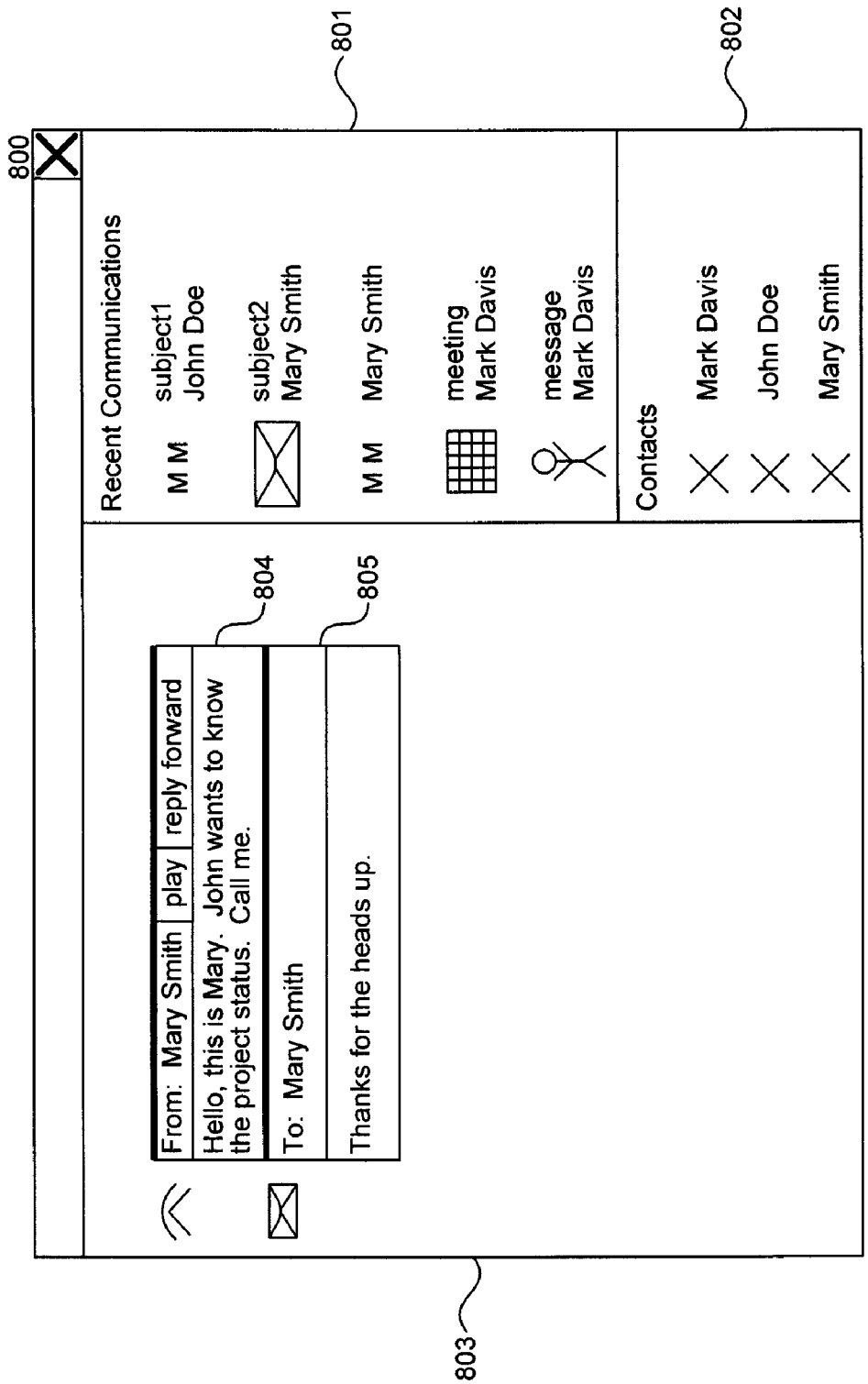
FIG. 8 illustrates a display page displaying a reply voice mail message in one embodiment.

FIG. 8 illustrates a display page displaying a reply voice mail message in one embodiment. Display page 800 includes a recent communications area 801, a contacts area 802, a message display area 803, a voice mail message 804, and an electronic mail message 805. When the user selected to reply to the voice mail message, the messaging system determined that, since Mary Smith is not online and is in a meeting, the appropriate mode for the reply was electronic mail message. The messaging system then invoked a component of the electronic mail message client application to control the inputting and sending of the reply electronic mail message.

Figure 9:
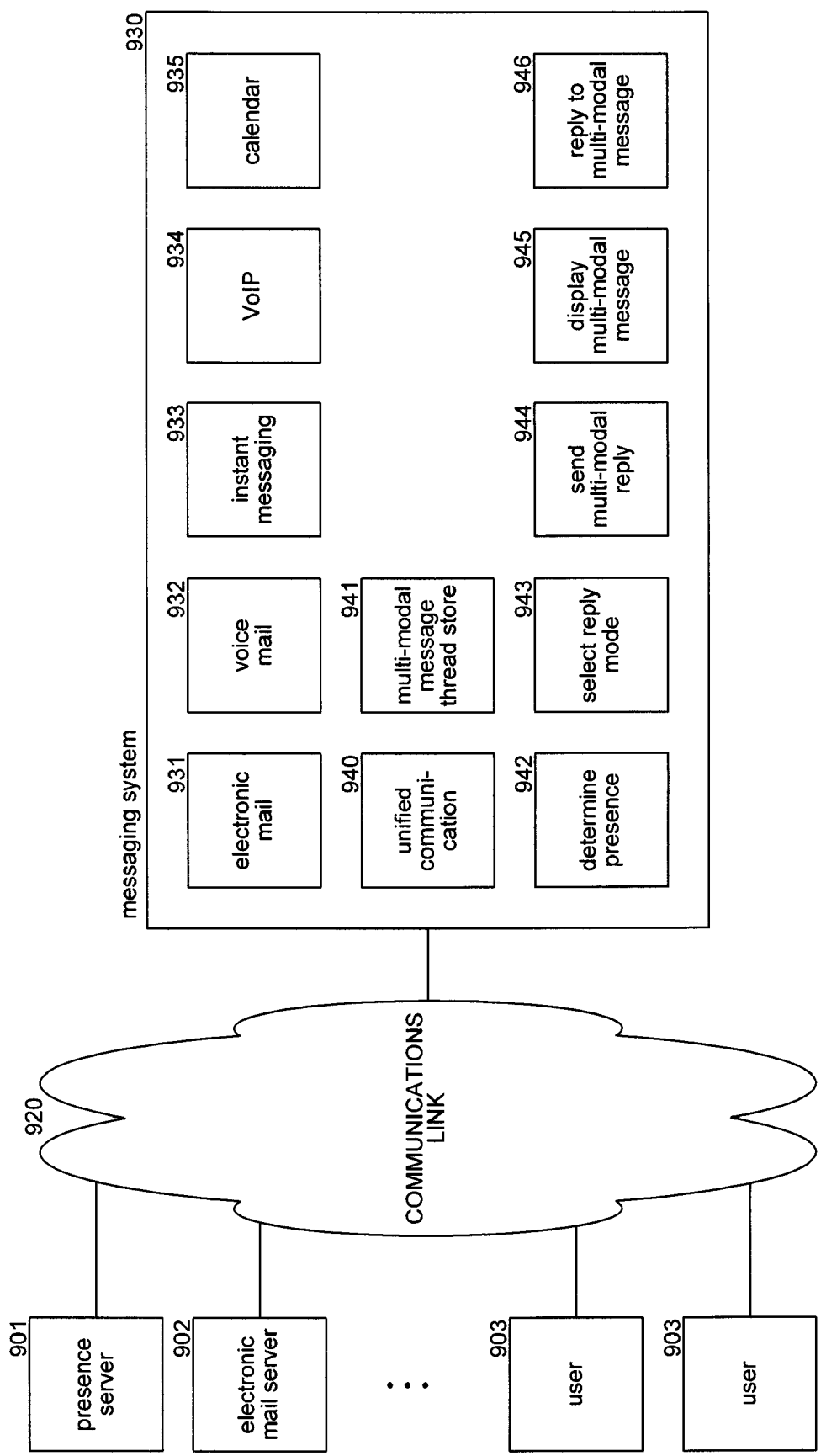
FIG. 9 is a block diagram that illustrates components of the messaging system in one embodiment.

FIG. 9 is a block diagram that illustrates components of the messaging system in one embodiment. The messaging system 930 may be connected to a presence server 901, an electronic mail server 902 and other messaging servers, and user computing systems 903 via communications link 920. The messaging system may interact with various components of communication client applications such as an electronic mail component 931, a voice mail component 932, an instant messaging component 933, a VoIP component 934, and a calendar component 935. The messaging system may include a unified communications component 940 and a multi-modal message thread store 941. The unified communications component provides the user interface for interacting with multi-modal message threads in a uniform manner. The multi-modal message thread store stores an indication of the multi-modal message threads. The messaging system also includes a determine presence component 942, a select reply mode component 943, a send multi-modal reply component 944, a display multi-modal message component 945, and a reply to multi-modal message component 946. The determine presence component determines the current presence of a user to whom a message is to be sent. The select reply mode component selects a mode of communications for a reply message. The send multi-modal reply component controls the sending of a reply message. The display multi-modal message component displays a multi-modal message thread. The reply to multi-modal message component generates a reply to a multi-modal message and invokes the send multi-modal reply component to send the reply.

Figure 10:
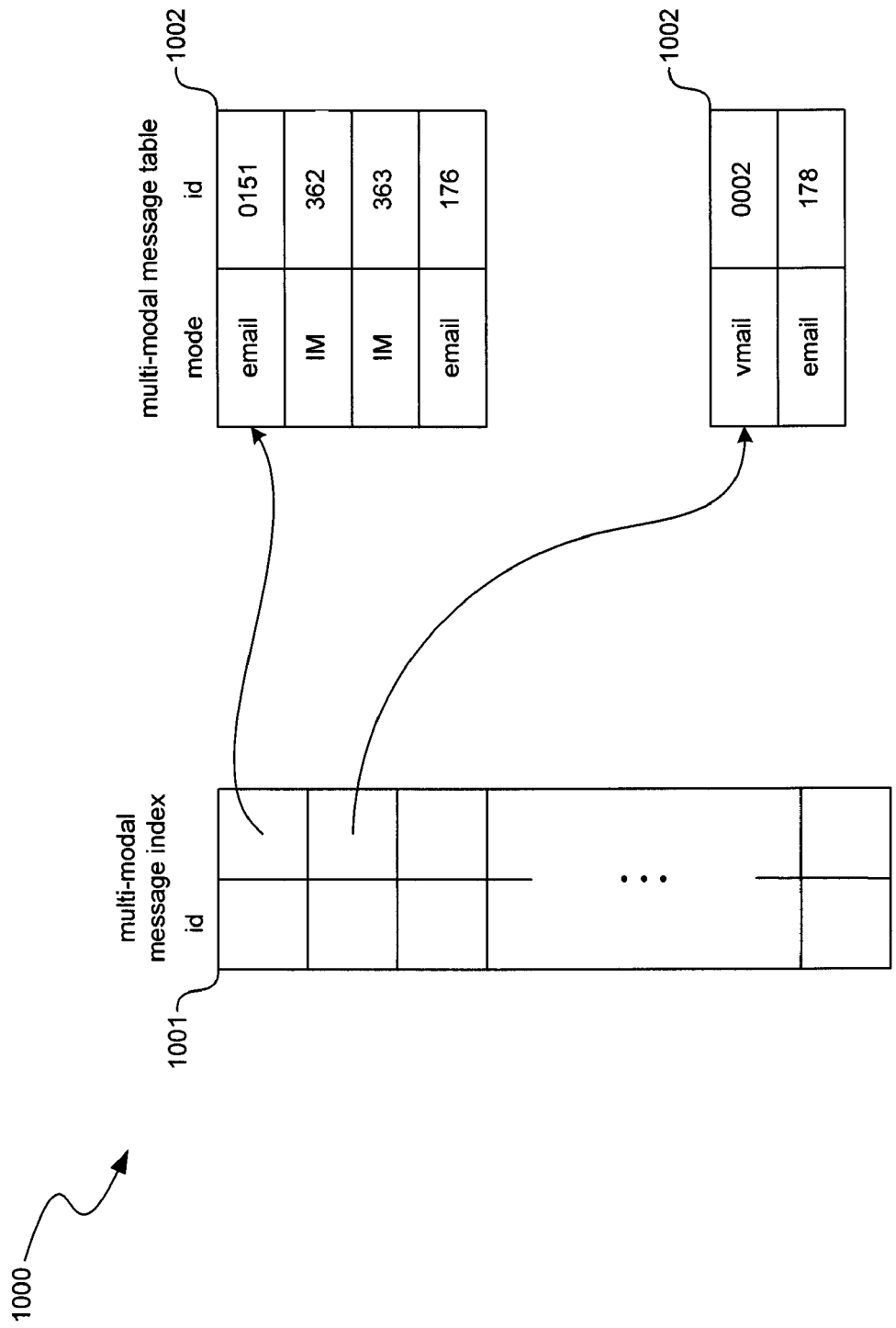
FIG. 10 is a block diagram that illustrates a data structure for a multi-modal message thread store in one embodiment.

FIG. 10 is a block diagram that illustrates a data structure for a multi-modal message thread store in one embodiment. The data structure 1000 may include a multi-modal message index 1001 with an entry for each multi-modal message thread. Each entry contains an identifier of the multi-modal message thread and a pointer to a multi-modal message table 1002. Each multi-modal message table contains an entry for each message of a multi-modal message thread. Each entry contains an indication of the mode of the message along with an identifier of the message. The identifier of a message may be a reference provided by a communication client application that stores the actual message. For example, an entry of "email 0151" indicates that the message is an electronic mail message with an identifier of "0151." One skilled in the art will appreciate that this data structure is just one example of a data structure for storing multi-modal message threads. Other data structures may include hash tables, linked lists, tree structures, and so on.

The computing devices on which the messaging system may be implemented may include a central processing unit, memory, input devices (e.g., keyboard and pointing devices), output devices (e.g., display devices), and storage devices (e.g., disk drives). The memory and storage devices are computer-readable media that may contain instructions that implement the messaging system. In addition, the instructions, data structures, and message structures may be stored or transmitted via a data transmission medium, such as a signal on a communications link. Various communications links may be used, such as the Internet, a local area network, a wide area network, or a point-to-point dial-up connection.

The messaging system may be implemented on various computing systems or devices including personal computers, server computers, multiprocessor systems, microprocessor-based systems, network PCs, minicomputers, mainframe computers, distributed computing environments that include any of the above systems or devices, and the like. The messaging system may be used by various computing systems such as personal computers, cell phones, personal digital assistants, consumer electronics, home automation devices, and so on.

The messaging system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 11:
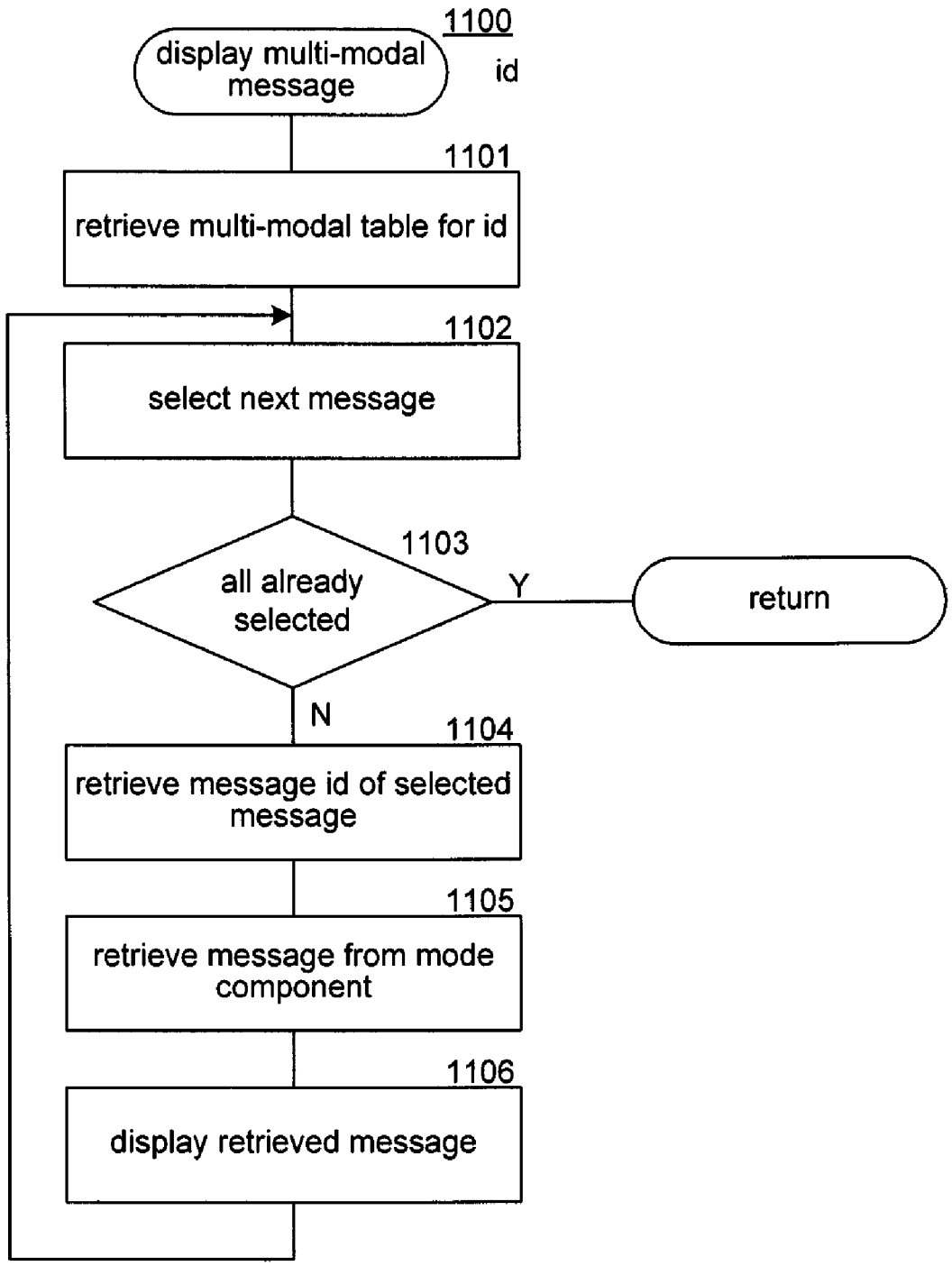
FIG. 11 is a flow diagram that illustrates the processing of the display multi-modal message component of the messaging system in one embodiment.

FIG. 11 is a flow diagram that illustrates the processing of the display multi-modal message component of the messaging system in one embodiment. The component 1100 is passed the identifier of a multi-modal message thread and displays its messages in a message display area. In block 1101, the component retrieves the multi-modal table corresponding to the passed identifier. In blocks 1102-1106, the component loops selecting and displaying each message. In block 1102, the component selects the next message of the multi-modal message thread. In decision block 1103, if all the messages have already been selected, then the component returns, else the component continues at block 1104. In block 1104, the component retrieves the message identifier of the selected message. In block 1105, the component retrieves the message from the communication client component of the selected message. In block 1106, the component displays the retrieved message and then loops to block 1102 to select the next message. The component may display the retrieved message by invoking the appropriate communication client applications.

Figure 12:
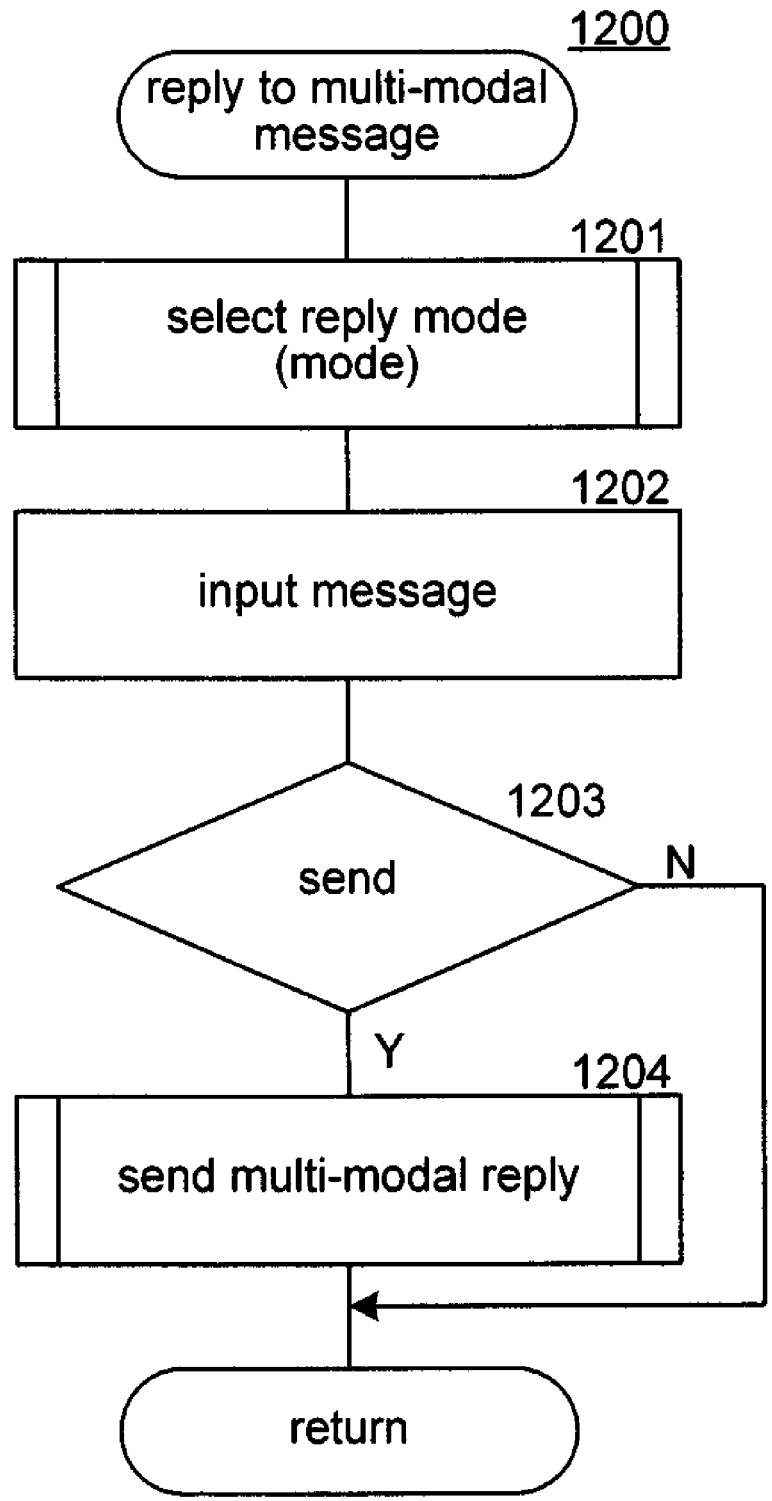
FIG. 12 is a flow diagram that illustrates the processing of the reply to multi-modal message component of the messaging system in one embodiment.

FIG. 12 is a flow diagram that illustrates the processing of the reply to multi-modal message component of the messaging system in one embodiment. The component 1200 selects a mode of communication, inputs a message, and sends the message as a reply. In block 1201, the component invokes the select reply mode component to select an appropriate mode of communication. In block 1202, the component inputs the message for the reply by invoking the appropriate communication client application. In decision block 1203, if the message is to be sent, then the component continues at block 1204, else the component returns. In block 1204, the component invokes the send multi-modal reply component to send the reply and update the multi-modal message thread store. The component then returns.

Figure 13:
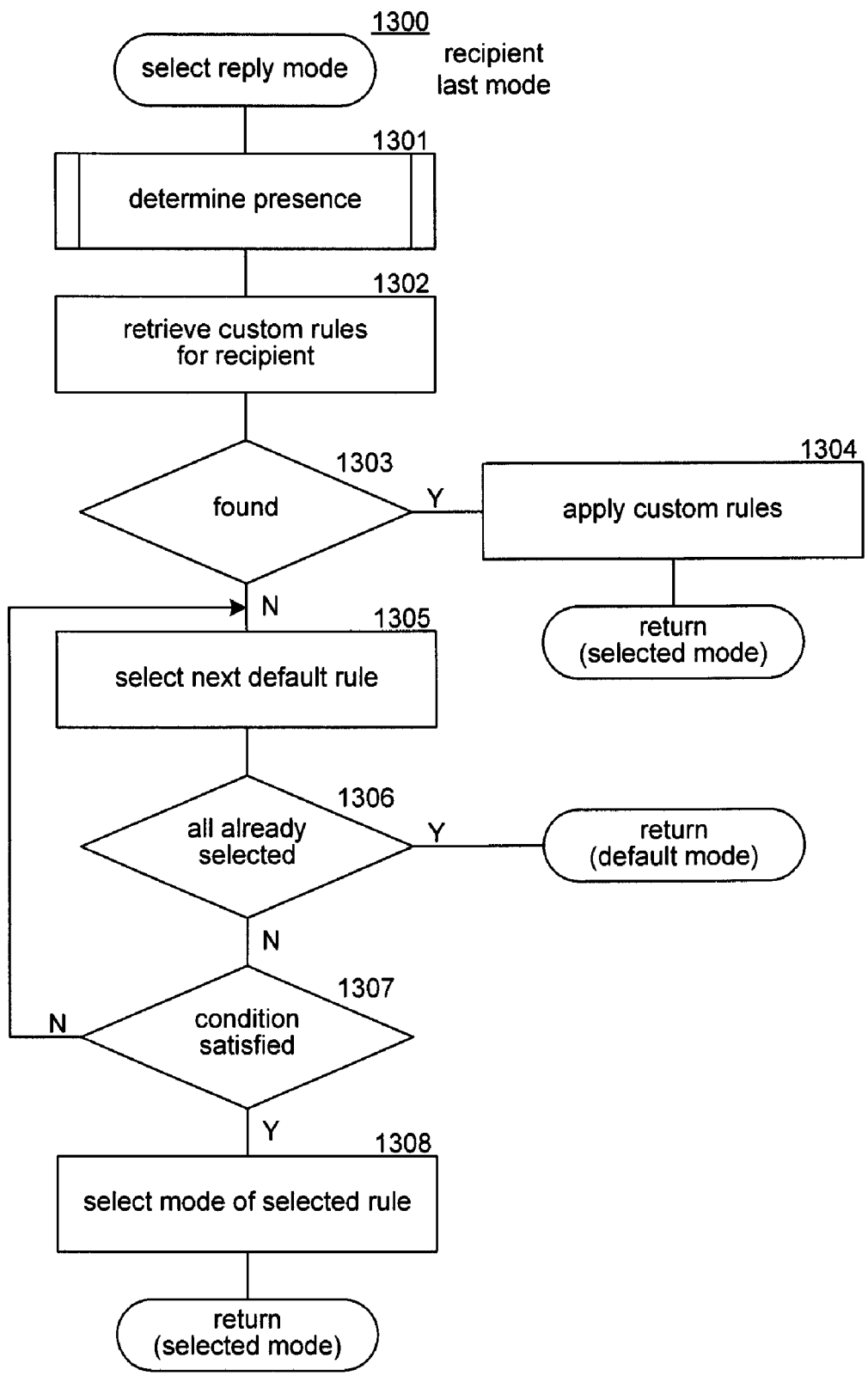
FIG. 13 is a flow diagram that illustrates the processing of the select reply mode component of the messaging system in one embodiment.

FIG. 13 is a flow diagram that illustrates the processing of the select reply mode component of the messaging system in one embodiment. The component 1300 is passed a recipient and an indication of the mode of the message that is being replied to. The component selects an appropriate reply mode that may be based in part on the last mode. For example, if the last mode was a voice mail, then the messaging system may select VoIP as the reply mode. In contrast, if the last mode was an electronic mail message, then the messaging system may select instant message as the reply mode. In block 1301, the component invokes the determine presence component to determine the current presence of the recipient. In block 1302, the component retrieves custom rules for the recipient. In one embodiment, the messaging system may allow custom rules to be defined for selecting an appropriate reply mode. The custom rules may be provided by the user of the messaging system or by an administrator of an enterprise. The rules may be a series of conditions and associated reply modes. To apply the rules, the component may check each condition until one is satisfied and return the associated reply mode of that satisfied condition. In decision block 1303, if custom rules have been found, then the component continues at block 1304, else the component continues at block 1305. In block 1304, the component applies the custom rules and returns the selected mode. In blocks 1305-1308, the component loops selecting default rules until all the rules have been selected or a condition of a rule has been satisfied. In block 1305, the component selects the next default rule. In decision block 1306, if all the default rules have already been selected, then the component returns a default mode, else the component continues at block 1307. In decision block 1307, if the condition of the selected rule is satisfied, then the component continues at block 1308, else the component loops to block 1305 to select the next default rule. In block 1308, the component selects the mode of the selected rule whose condition is satisfied and then returns the selected mode.

Figure 14:
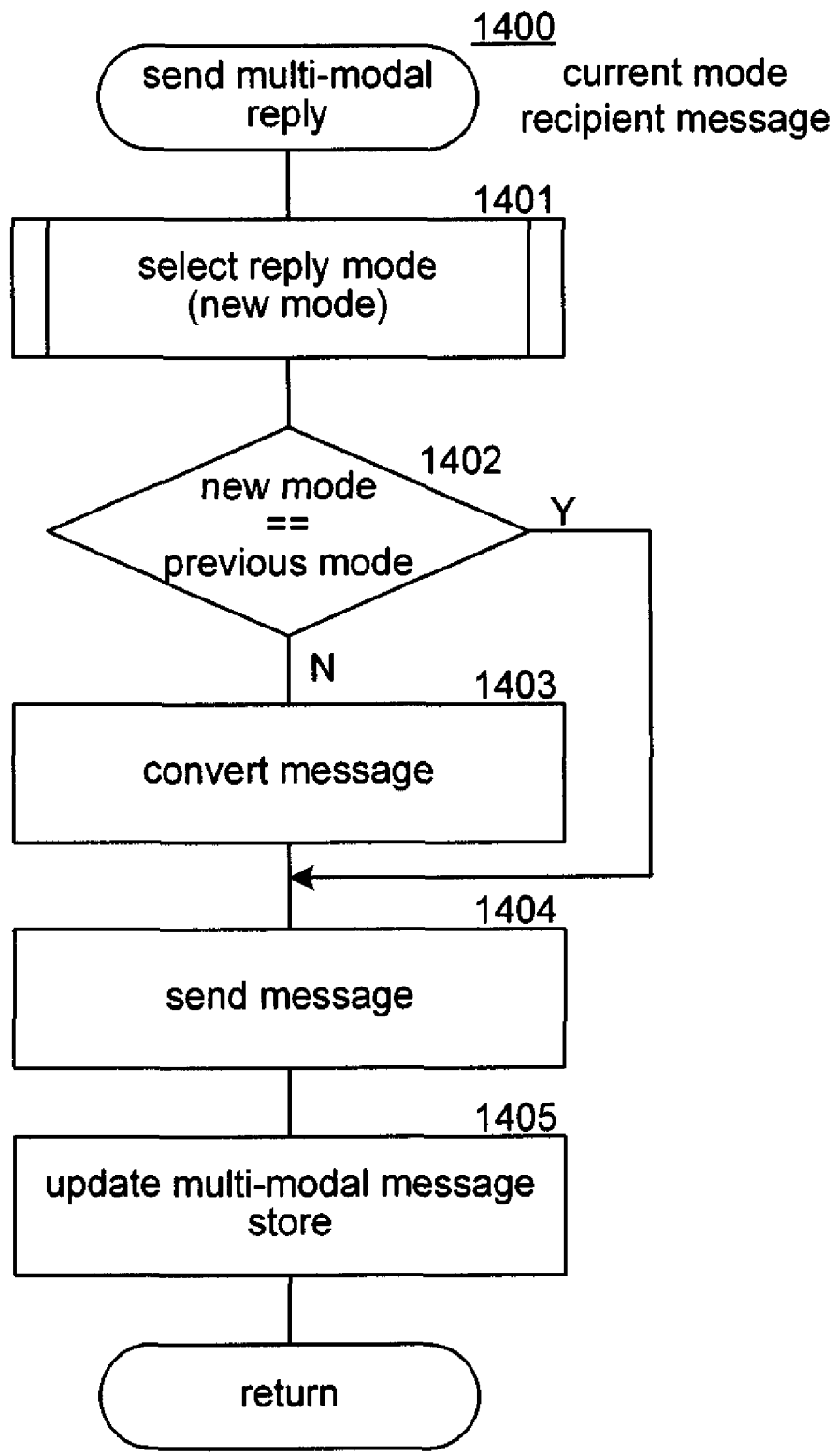
FIG. 14 is a flow diagram that illustrates the processing of the send multi-modal reply component of the messaging system in one embodiment.

FIG. 14 is a flow diagram that illustrates the processing of the send multi-modal reply component of the messaging system in one embodiment. The component 1400 is passed a current mode, a recipient, and a message. The component determines a new mode of communication and, if different from the previously selected mode of communication for the message (e.g., a reply), converts the message to the new mode of communication, sends the message, and updates the multi-modal message thread store. In block 1401, the component invokes the select reply mode component to determine a new reply mode. In decision block 1402, if the new reply mode is the same as the previous reply mode, then the component continues at block 1404, else the component continues at block 1403. In block 1403, the component converts the message to the new reply mode. In block 1404, the component sends the message using the appropriate communication client application. In block 1405, the component updates the multi-modal message thread store with the newly sent message and then returns.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. The messaging system may select a reply mode that factors in the different levels of presence of multiple recipients. For example, the messaging system may select a reply mode that is based on the recipient with the lowest level of presence. Alternatively, the message system may use a different mode for each recipient and store an indication of the different modes in the multi-modal message thread store. The messaging system may also be implemented on a web server that provides the user interface via web pages. Accordingly, the invention is not limited except as by the appended claims.

We claim:

1. A method in a computing system with a processor and a memory for sending a message, the method comprising:
   receiving from the user an indication to send a message to a recipient; and
   after receiving the indication,
      automatically determining by the computing system a send mode of communication to use when sending the message, the send mode being selected based on presence information of the recipient;
      inputting from the user the message in context of the determined send mode; and
      sending to the recipient the message in accordance with the determined send mode for the recipient,
   wherein a subsequent reply to the message uses a reply mode of communication that is different from the determined send mode of communication and the message and the reply are stored as a multi-modal message thread.

2. The method of claim 1 including receiving the reply to the message, the reply using the reply mode of communication that is different from the determined send mode of communication.

3. The method of claim 2 including storing the message and the reply as the multi-modal message thread.

4. The method of claim 2 including displaying at the same time the message in context of the send mode of communication and the reply in the reply mode of communication.

5. The method of claim 4 including displaying in association with the displayed message an icon indicating the send mode of communication and displaying in association with the displayed reply an icon indicating the reply mode of communication.

6. The method of claim 1 including displaying to the user an indication of messages previously received by the user and wherein the receiving of the indication to send the message includes selecting to reply to a message previously received by the user.

7. The method of claim 6 wherein the send mode of communication of the message is different from the mode of communication of the message previously received by the user.

8. The method of claim 1 including displaying a multi-modal message thread by selecting each message of the thread and its mode of communication and displaying each message in context of its mode of communication.

9. The method of claim 1 wherein the determining of the reply mode of communication selects an online reply mode of communication when the presence of the recipient indicates that the recipient is online.

10. The method of claim 1 wherein when the send mode of communication is electronic mail message and the recipient is online, the reply mode of communication is instant messaging.

11. A computer-readable storage medium that is not a signal containing instructions for controlling a computing system to generate a multi-modal message thread, by a method comprising:
  displaying to a user an indication of a previously received message, the message being sent from a sender in a send mode of communication;
  receiving from the user an indication to reply to the displayed message; and
  automatically determining by the computing system a reply mode of communication to use when replying to the message, the reply mode being selected based on presence information of the sender of the message and being different from the send mode of communication;
  inputting from the user the reply in context of the determined reply mode of communication; and
  sending to the sender the reply in accordance with the determined reply mode of communication.

12. The computer-readable storage medium of claim 11 including storing the message and the reply as a multi-modal message thread.

13. The computer-readable storage medium of claim 11 including displaying the multi-modal message thread by displaying each message in the thread in context of its mode of communication.

14. The computer-readable storage medium of claim 11 including receiving from the sender a second message, the second message being sent in a second send mode of communication that is different from the send mode of communication.

15. A computing device with a processor and a memory for communicating via a multi-modal message thread, comprising:
  a component that presents to a user an indication of a previously received message, the message being sent from a sender in a send mode of communication;
  a component that receives from the user an indication to reply to the message;
  a component that determines a reply mode of communication to use when replying to the message, the reply mode of communication being selected based on presence information of the sender of the message and being different from the send mode of communication;
  a component that inputs from the user the reply in context of the determined reply mode of communication; and
  a component that sends to the sender the reply in accordance with the determined reply mode of communication
  wherein the multi-modal message thread includes the message and the reply.

16. The computing device of claim 15 including a component that receives a second message that is a reply to the reply, the second message using a second send mode of communication that is different from the send mode of communication of the message.

17. The computing device of claim 16 including wherein the multi-modal message thread further includes the second message.

18. The computing device of claim 15 wherein the second send mode of communication is different from the reply mode of communication.

19. The computing device of claim 15 including a component that displays at the same time the message in context of the send mode of communication and the reply in the reply mode of communication.

20. The computing device of claim 19 including a component that displays in association with the displayed message an icon indicating the send mode of communication and displaying in association with the reply an icon indicating the reply mode of communication.

* * * * *